United States Patent
King

(10) Patent No.: US 6,697,922 B2
(45) Date of Patent: Feb. 24, 2004

(54) APPARATUS FOR TRANSFERRING DATA FROM A MEMORY UNIT TO A DIGITALLY SWITCHED POTENTIOMETER USING A MICROCONTROLLER

(75) Inventor: Craig King, Phoenix, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 105 days.

(21) Appl. No.: 09/880,664

(22) Filed: Jun. 13, 2001

(65) Prior Publication Data

US 2002/0194439 A1 Dec. 19, 2002

(51) Int. Cl.[7] ............................ G06F 13/00; H03M 1/66
(52) U.S. Cl. ........................ 711/154; 341/144; 341/154
(58) Field of Search ........................... 711/154; 341/144, 341/154; 323/354

(56) References Cited

U.S. PATENT DOCUMENTS 5,084,667 A * 1/1992 Drori et al. ................. 323/354
5,243,535 A * 9/1993 Bolan et al. .................. 702/65
5,717,935 A * 2/1998 Zanders et al. ............. 713/300
6,201,491 B1 * 3/2001 Brunolli et al. ............. 341/144

* cited by examiner

Primary Examiner—Glenn Gossage
(74) Attorney, Agent, or Firm—Baker Botts L.L.P.

(57) ABSTRACT

A microcontroller comprises a central processing unit with an execution unit for executing instructions. A memory unit is coupled with the central processing unit through a bus. A digitally switched potentiometer is provided and a data transfer unit is coupled with the memory unit and the digitally switched potentiometer, wherein the data transfer unit transfers data between the memory unit and the potentiometer sub-circuit upon execution of a predefined instruction. The data transfer circuit may include a counter receiving a clock signal from a programmable divider. The data transfer circuit may also include a loop register and an incrementer. The memory unit may comprise an electrically erasable programmable read only memory (EEPROM) including flash EEPROM.

12 Claims, 5 Drawing Sheets

APPARATUS FOR TRANSFERRING DATA FROM A MEMORY UNIT TO A DIGITALLY SWITCHED POTENTIOMETER USING A MICROCONTROLLER

FIELD OF THE INVENTION

The present application relates generally to a microcontroller and a memory unit coupled to an electronic digitally switched potentiometer.

BACKGROUND OF THE INVENTION

Microcontrollers are used in many applications and comprise usually a plurality of peripheral components. Within a microcontroller a central processing unit (CPU) having an arithmetic logic unit (ALU) and a load and store unit or a combination of both is located. The CPU is coupled through a bus with a memory to provide storage capacity for program instructions and data. Program and data memory can be separate with different bus lines or embodied in a single memory unit. Other peripheral components may be coupled through the same or additional busses. A known peripheral device is an electronic digital potentiometer, for example a digitally switched potentiometer as disclosed in U.S. Pat. No. 6,201,491 which is hereby incorporated by reference. Such a digitally switched potentiometer can be controlled by the CPU and is thereby coupled through such a bus with the CPU. A microcontroller is designed to execute a plurality of instructions. The instruction set defines the capability of the respective microcontroller. The processing speed of a microcontroller depends on many factors. The instruction set is one of them as complex tasks might need a plurality of instructions to be executed. Generally one can say, the less the number of instructions that has to be executed for a specific task, the faster that task can be performed. For supplying a digitally switched potentiometer with data, the CPU has to load that data into registers and then move the data to the digitally switched potentiometer. A problem occurs in case a great deal of data transfers have to be executed. In such a case, significant time might be used to perform such a task.

SUMMARY OF THE INVENTION

Therefore, the present application discloses exemplary embodiments which overcome the above mentioned problems as well as other shortcomings and deficiencies of existing technologies.

In a first exemplary embodiment a microcontroller comprises a central processing unit with an execution unit for executing instructions. A memory unit is coupled with the central processing unit through a bus. Furthermore, a digitally switched potentiometer is provided and a data transfer unit is coupled with the memory unit and the potentiometer, wherein the data transfer unit transfers data between the memory unit and the potentiometer upon execution of a predefined instruction.

A method of transferring data between a memory unit and a potentiometer within a microcontroller arrangement comprises the steps of:
- providing an instruction set for the microcontroller wherein an instruction within the instruction set defines a data transfer between the memory unit and the potentiometer;
- upon execution of the instruction transferring data between the memory unit and the potentiometer.

The data transfer unit of the microcontroller may comprise a counter having a clock input receiving a clock and an output which is coupled with the memory unit. Furthermore a programmable divider unit for dividing the clock may be provided. The data transfer unit may further comprise a loop register and an incrementer unit coupled with the loop register.

The memory unit may be an electrically erasable programmable read only memory (EEPROM) or a flash EEPROM.

The instruction may comprise an opcode and an address specifying a memory location or an opcode and an address specifying a start memory location and an end memory location. In another embodiment, the instruction comprises an opcode and an address specifying a start memory location and a number indicating the number of consecutive data from the start memory location.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

Figure 1:
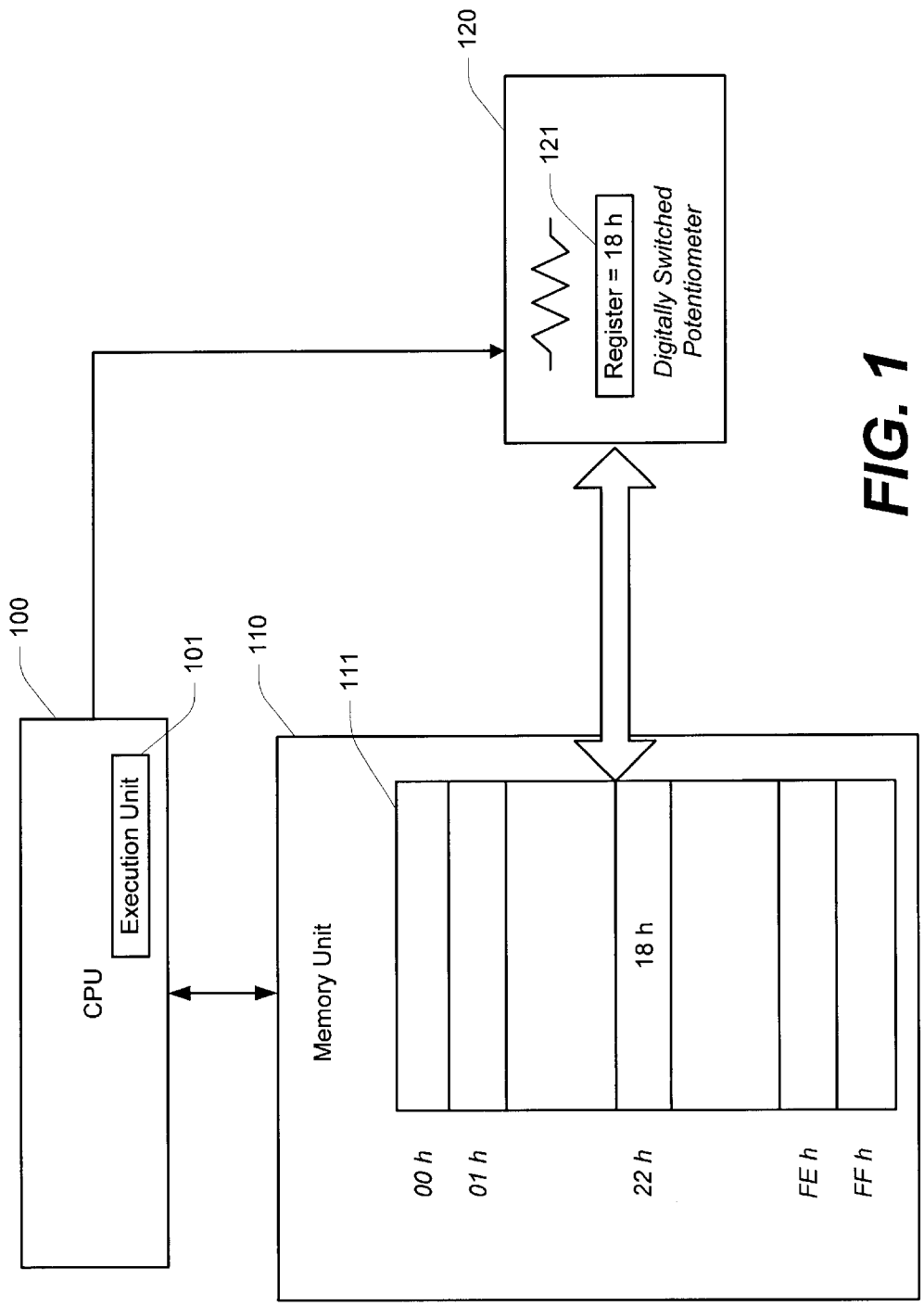
FIG. 1 shows a schematic block diagram of a microcontroller CPU, memory unit and digital potentiometer, according to an exemplary embodiment of the present invention.

Turning to the drawings, exemplary embodiments of the present application will now be described. In FIG. 1, depicted is a schematic block diagram of a microcontroller central processing unit (CPU), memory unit and digital potentiometer, according to an exemplary embodiment of the present invention. The CPU, generally represented by the numeral 100, comprises an execution unit 101 for executing instructions provided, for example, by a memory unit 110 which is coupled with the CPU 100 through a bus. In this exemplary embodiment, data and programs are stored commonly within the memory unit 110. Of course, programs can be stored separately within a special program memory area having its own program memory bus. The memory unit 110 comprises a memory section 111 which is a dedicated portion of memory unit 110 for providing data to a digitally switched potentiometer 120. Therefore, the digitally switched potentiometer 120 is coupled with this memory section 111. Memory section 111 in this embodiment comprises, for example, 256 memory cells starting from 00 h to FFh. Again, memory section 111 can also be a separate independent memory unit coupled with a separate or a peripheral bus. The digitally switched potentiometer sub-circuit 120 comprises a control register 121 whose content controls the wiper position of the potentiometer.

Figure 4:
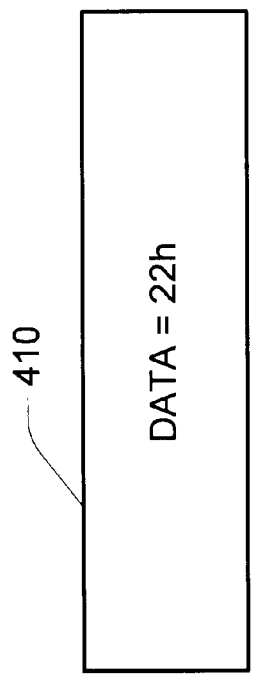
FIG. 4 shows an exemplary instruction structure according to an embodiment of the present invention.
Figure 4:
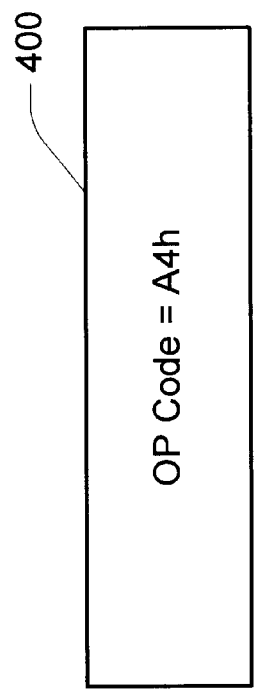

According to the exemplary embodiment of the present invention the instruction set comprises two specific defined instructions for data transfer between the potentiometer sub-circuit 121 and the memory section 111. A first instruction, for example, addresses the memory section 111 with an offset value. FIG. 4 shows an exemplary structure of such an instruction. The first portion 400 of the instruction contains the opcode identifying the instruction, for example A4 h, and the second portion 410 contains the offset value, for example 22 h. This instruction initiates a move of the content from memory location 22h to the control register 121 within digitally switched potentiometer 120. In this example, the memory section 111 within memory unit 110 starts at location 00 h. Of course, any other address is possible. 255 memory cells follow consecutively from this first memory cell up to location FFh. Any other number of cells is possible. The offset value may represent any memory location within memory section 111. Execution of this instruction can be performed within a single cycle, thus allowing quick transfers from memory unit 110 to digitally switched potentiometer 120. The second instruction can perform a reverse function in which the content of control register 121 is transferred to a specified location within memory section 111. Central processing unit 100 comprises all necessary components to initiate the data transfer. Respective control signals are sent to memory unit 110 and digitally switched potentiometer sub-circuit 120 through respective data and control lines.

Figure 2:
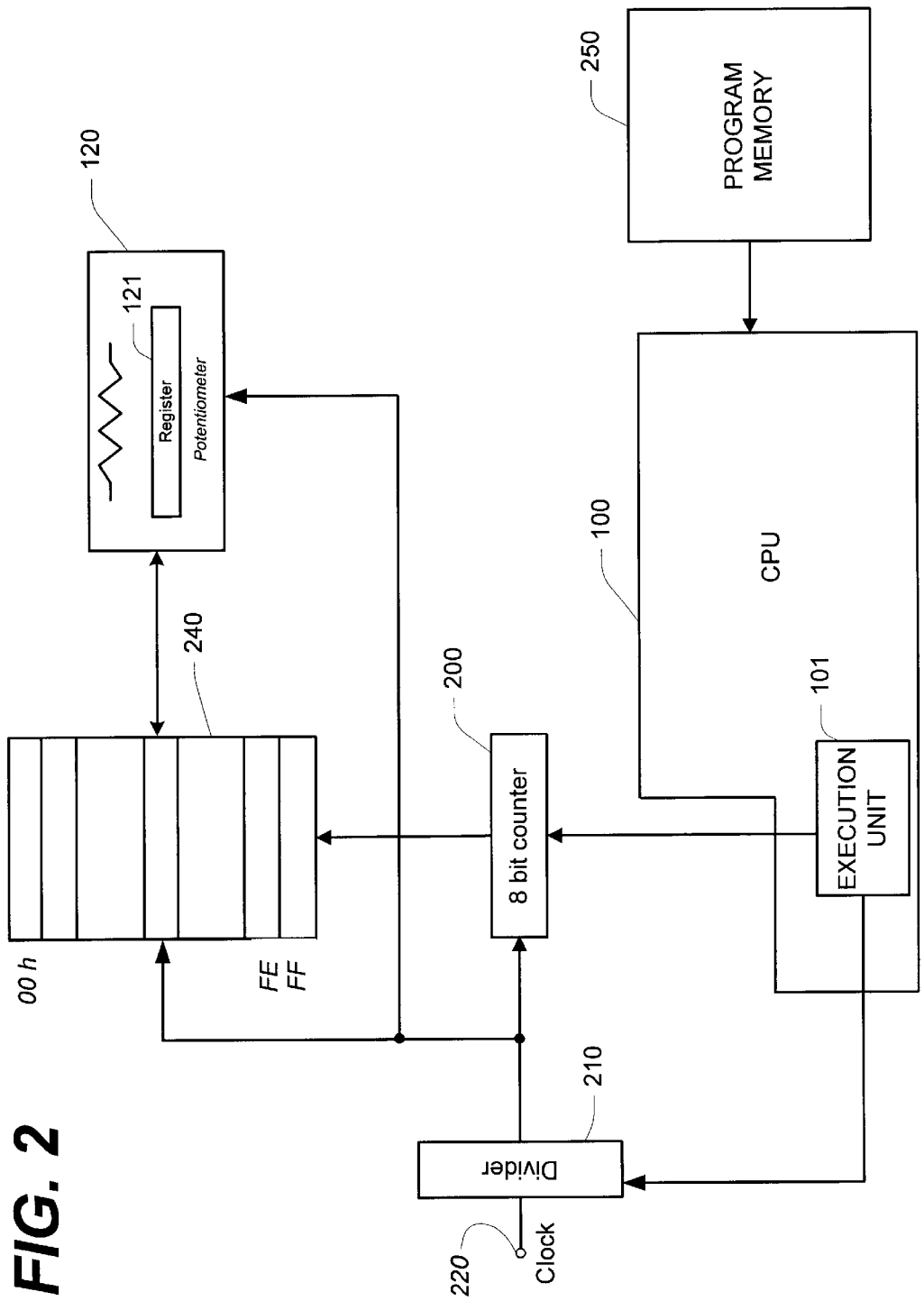
FIG. 2 shows a schematic block diagram of a microcontroller CPU, memory unit, counter, divider and digital potentiometer, according to another exemplary embodiment of the present invention.

FIG. 2 depicts a schematic block diagram of a microcontroller CPU, memory unit, counter, divider and digital potentiometer, according to another exemplary embodiment of the present invention. The CPU 100 comprises an execution unit 101 which is coupled with an eight bit counter 200. Counter 200 receives a counter clock signal from the output of a divider 210 whose input receives a clock signal 220. Divider 210 is programmable by CPU 100. The output of counter 200 addresses memory unit 240 which again comprises 256 memory cells in the form of a volatile memory, e.g., random access memory (RAM) or non-volatile memory, e.g., an electrically erasable programmable read only memory (EEPROM). Memory unit 240 is coupled through a data bus with digitally switched potentiometer sub-circuit 120 which again comprises a control register 121. Data transfer is initiated by respective control signals generated from the counter clock signal as indicated in FIG. 2. In this embodiment a separate program memory 250 is provided which supplies CPU 100 with instructions through a dedicated bus.

This embodiment can provide additional functionality, for example, if combined with the above described embodiment. A dedicated instruction can start a process in which a plurality of values is permanently transferred to digitally switched potentiometer sub-circuit 120 in a loop mode. To this end, execution unit 101 resets counter 200 and controls divider 210 to generate a counter clock output signal. This signal is used to generate control signals to transfer an address to memory unit 240 from the output of counter 200. The data value from the addressed memory cell within memory unit 240 is then transferred into control register 121 of digitally switched potentiometer sub-circuit 120. Counter 200 is then incremented and the above described steps are repeated. As counter 200 is an eight bit counter 256, consecutive addresses are generated and output to memory unit 240. Once counter reaches the value FFh=256, the next clock resets the counter value to 00 h=0 and the procedure is repeated. Thus, a loop mode is initiated. This way, repetitive signals can be generated. Divider 210 provides the feature of different sampling clocks. Divider 210 is programmable and can therefore provide a plurality of different counter clock signals. Different instructions can be defined to operate this embodiment. For example, an instruction can setup a counter clock speed, another instruction can start the counter and yet another can stop the counter.

Figure 3:
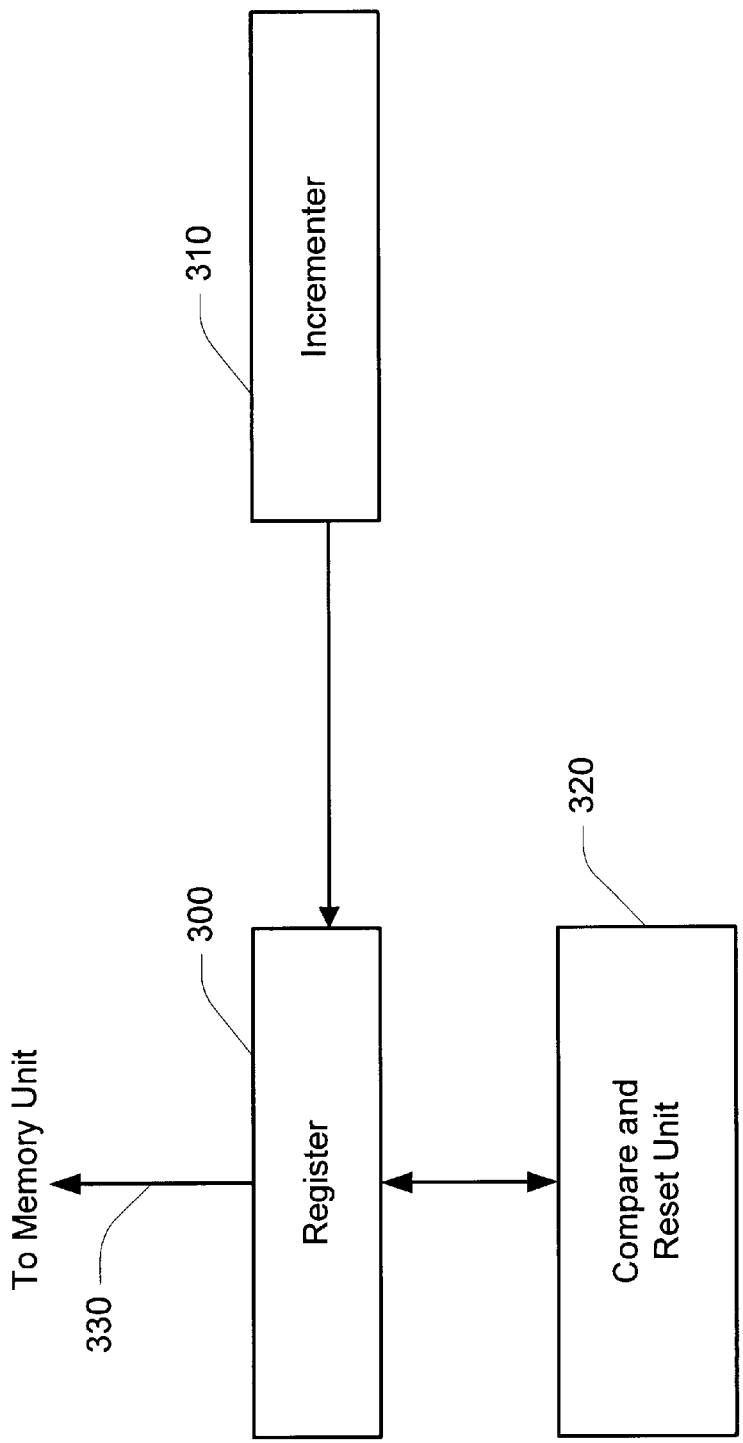
FIG. 3 shows a schematic block diagram of a loop featuring a register, compare and reset unit and incrementer.

FIG. 3 depicts a schematic block diagram of a loop circuit featuring a register, compare and reset unit and incrementer. Instead of a counter, a register 300 is coupled to an incrementer 310. Furthermore, a compare and reset unit 320 is provided which is connected to register 300. The output signal 330 of register 300 is again used to address a memory unit containing a plurality of consecutive values to be transmitted to a digitally switched potentiometer sub-circuit 120.

This embodiment comprises even greater flexibility as a plurality of sections within a memory unit can be addressed and used for a loop function. The compare and reset unit 320 can be programmed to store a start value and an end value. Initially, the compare and reset unit 320 transfers the start value into register 300. Incrementer 310 can be triggered by a divider 210 as shown in FIG. 2. Thus, consecutive addresses are available at output 330 of register 300. Compare and reset unit 320 compares the content of register 320 with an end value. Once the end value is reached in register 300, compare and reset unit 320 transfers the start value into register 300. Thus, a very flexible loop mechanism can be provided.

Figure 5:
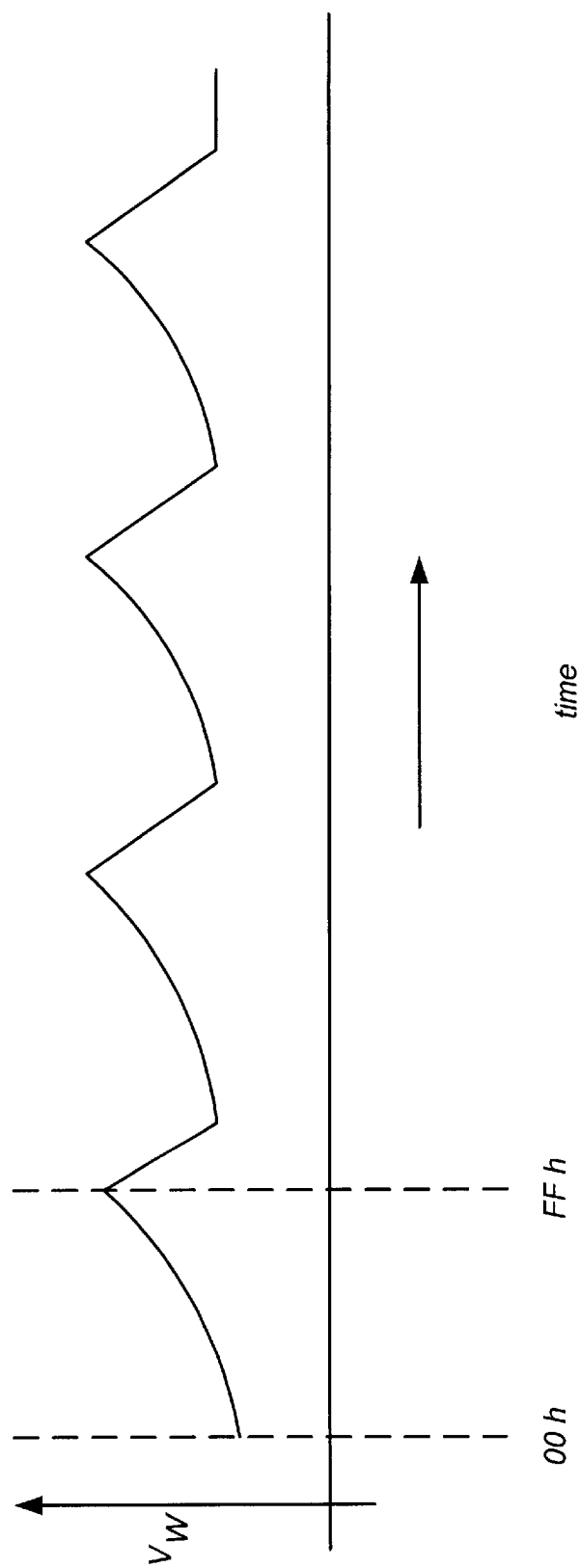
FIG. 5 shows a graph of an output signal generated by an embodiment of the present invention.

FIG. 5 shows an waveform graph of an output signal generated by the digitally switched potentiometer, according to the exemplary embodiments of the present invention. A voltage amplitude of the waveform is represented on the y-axis and time on the x-axis. The digital representation of the output signal may be stored within memory locations 00 h to FFh. According to the first embodiment, a program loop circuit contains the dedicated instruction to transfer data from memory section 111 to digitally switched potentiometer sub-circuit 120. Furthermore, the address value is incremented within the loop. According to the second and third embodiments, divider 210 is programmed to generate a respective counter clock signal and upon execution of a dedicated instruction the values of memory section 240 are consecutively transferred to digitally switched potentiometer sub-circuit 120. Thus an output signal as shown in FIG. 5 can be generated with no further processing by CPU 100.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those of ordinary skill in the pertinent arts and having the benefit of this disclosure. The depicted and described embodiments of the invention are exemplary only, and are not exhaustive of the scope of the invention. Consequently, the invention is intended to be limited only by the spirit and scope of the appended claims giving full cognizance to equivalents in all respects.

What is claimed is:

1. An apparatus for transferring a plurality of data values from a memory unit to a digitally switched potentiometer, comprising:

a microcontroller having a central processing unit (CPU);

a memory unit coupled to and controlled by said microcontroller; and a digitally switched potentiometer, said digitally switched potentiometer having a storage register, wherein the storage register is coupled to said memory unit and controlled by said microcontroller, wherein each of a plurality of data values from said memory unit is stored in the storage register and each of the plurality of stored data values is used for selecting each of a plurality of resistance values of said digitally switched potentiometer.

2. The apparatus of claim 1, wherein the CPU receives an instruction, whereby the instruction comprises an opcode identifying the instruction and an offset value for selecting an address of a location in said memory unit.

3. The apparatus of claim 1, wherein said memory unit is an electrically erasable programmable read only memory (EPROM).

4. The apparatus of claim 3, wherein the EEPROM is flash EEPROM.

5. The apparatus of claim 1, wherein said memory unit has a plurality of memory locations dedicated for storing the plurality of data values.

6. The apparatus of claim 5, wherein the CPU receives an instruction, whereby the instruction comprises an opcode identifying the instruction and an offset value for selecting a starting address of a first location of the plurality of memory locations.

7. The apparatus of claim 5, further comprising a counter coupled to said memory unit, wherein said counter sequentially addresses each of the plurality of memory locations so that each of the plurality of data values contained therein may be sequentially stored in the storage register.

8. The apparatus of claim 7, wherein said counter is incremented by a clock signal input.

9. The apparatus of claim 7, wherein said counter is controlled by said microcontroller.

10. The apparatus of claim 7, wherein the CPU receives an instruction, whereby the instruction comprises an opcode identifying the instruction and an offset value for selecting a starting address of a first location of the plurality of memory locations, and the CPU loads the starting address into said counter, whereby said counter sequentially addresses the plurality of memory locations starting at the first location.

11. The apparatus of claim 7, wherein said digitally switched potentiometer changes resistance values based upon each of the sequentially addressed plurality of data values.

12. The apparatus of claim 7, wherein the CPU receives an instruction, whereby the instruction comprises an opcode identifying the instruction, an offset value for selecting a starting address of a first location of the plurality of memory locations and a value indicating the number of sequential memory locations after the first locations, wherein the CPU loads the starting address into said counter and monitors the counter, whereby said counter sequentially addresses the plurality of memory locations starting at the first location until the number of sequential memory locations has been addressed then the CPU reloads the value into the counter.

* * * * *